Figure 1:
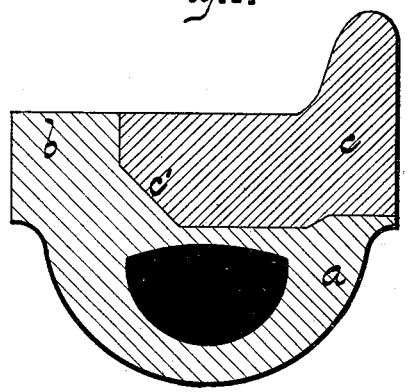

N. WASHBURN.
CAR-WHEEL.

No. 191,292. Patented May 29, 1877.

WITNESSES:
M. H. Dooley
Robt. F. Gaylord

INVENTOR:
N. Washburn
By W. E. Simonds
Att'y.

UNITED STATES PATENT OFFICE.

NATHAN WASHBURN, OF HARTFORD, CONNECTICUT.

IMPROVEMENT IN CAR-WHEELS.

Specification forming part of Letters Patent No. 191,292, dated May 29, 1877; application filed March 19, 1877.

*To all whom it may concern:*

Be it known that I, NATHAN WASHBURN, of Hartford, in the county of Hartford and State of Connecticut, have invented certain new and useful Improvements pertaining to a Car-Wheel, of which the following is a specification, reference being had to the accompanying drawings, where—

Figure 1 is a cross-section of the rim of a car-wheel.

The body of the wheel $a$ is, whether spoked or solid, of cast-iron. A portion, $b$, of the rim—a trifle less than half the width—is also of cast-iron, cast at the same time, and in one piece, with the body $a$. The remaining portion of the rim or tire $c$ is of steel. This portion comprehends the flange and that part of the tread which usually rides upon the rail. In actual use, the outer portion of the tread rarely rides in contact with the rail, so that it does not need to be made of the harder material—steel.

By this method of construction I obtain a wheel which is, practically, as long-lived as if the whole tread were of steel, and I save from one-third to one-half the cost of the steel, and from one-third to one-half the cost of "turning off," as the steel is much more difficult and costly to turn off than the iron. I give the steel part of the bevel $c'$ for two purposes, to wit: First, to save steel; and second, and more important, to get an enlarged junction-surface between the iron and steel. The iron and the steel are welded together in casting.

I claim as my improvement over former wheels—

A cast-iron car-wheel having the comparatively unused portion of the tread $b$ of cast-iron, and the remaining portion $c$, including the flange, of steel, welded or fused to the iron in the process of casting, substantially as shown and described.

NATHAN WASHBURN.

Witnesses:
W. E. SIMONDS,
ROBT. F. GAYLORD.